United States Patent [19]

Bowden et al.

[11] Patent Number: 4,511,999

[45] Date of Patent: Apr. 16, 1985

[54] GUN SHOT CONTROL UNIT FOR SEISMIC EXPLORATION

[75] Inventors: Edgar A. Bowden, Arlington; Gordon R. Deline, Carrollton; Gerard D. Koeijmans, Dallas, all of Tex.

[73] Assignee: Mobil Oil Corporation, New York, N.Y.

[21] Appl. No.: 442,818

[22] Filed: Nov. 18, 1982

Related U.S. Application Data

[63] Continuation of Ser. No. 163,600, Jun. 27, 1980, abandoned.

[51] Int. Cl.³ ............................ G01V 1/38; G01V 1/08
[52] U.S. Cl. ....................................... 367/23; 367/144; 181/107; 181/110; 377/20; 377/30
[58] Field of Search .................... 367/21, 23, 143, 144; 181/107, 106, 110; 377/20, 30; 375/34; 340/825.21

[56] References Cited

U.S. PATENT DOCUMENTS

| | | | |
|---|---|---|---|
| 3,346,064 | 10/1967 | Hawkins | 367/23 |
| 3,432,805 | 3/1969 | Romberg | 181/107 |
| 3,687,218 | 9/1972 | Ritter | 367/144 |
| 3,895,343 | 7/1975 | Farr | 367/190 |
| 3,972,019 | 7/1976 | Bassett | 367/55 |
| 3,985,199 | 10/1976 | Baird | 181/107 |
| 4,034,827 | 7/1977 | Leerskov et al. | 181/107 |
| 4,047,591 | 9/1977 | Ward et al. | 181/107 |
| 4,106,585 | 8/1978 | Huizer | 181/107 |
| 4,106,585 | 8/1978 | Huizer | 181/119 |
| 4,296,442 | 10/1981 | Bowden | 360/6 |
| 4,300,653 | 11/1981 | Cao et al. | 367/144 |

OTHER PUBLICATIONS

Avedik et al, "Ocean Bottom Refraction Seismograph", 1978, Marine Geo. Resear., vol. 3, pp. 357-379.
Ibrahim et al, "A Comparison . . . Shelf Zone", 46th Annu. SEG Mtg., Texas, 10/10/76.

*Primary Examiner*—Nelson Moskowitz
*Attorney, Agent, or Firm*—Alexander J. McKillop; Michael G. Gilman; Charles J. Speciale

[57] ABSTRACT

A gun shot control unit for a seismic exploration system compensates for the inherent delay between the shot command signal and the actual occurrence of the seismic pulse. A digital clock is synchronized with an external source. Timing pulses occurring at a time preceding the timing pulse upon which the occurrence of a seismic pulse is desired are produced by the clock. These timing pulses start a digital counter at a time preceding the desired time of occurrence of the seismic pulse. This counter is adjustable so that the delay which interposes between the timing and the actual occurrence of the seismic pulse can be minimized.

8 Claims, 14 Drawing Figures

| ADJUST TIMING ERROR | | | | | | | | |
|---|---|---|---|---|---|---|---|---|
| TIME MS | DIP SW ON | | | | | | | |
| | 1 | 2 | 3 | 4 | 5 | 6 | 7 | 8 |
| 1 |   | X |   | X |   | X |   | X |
| 2 |   | X |   | X |   | X | X |   |
| 3 |   | X | X | X |   |   |   | X |
| 4 |   | X |   | X | X |   | X |   |
| 5 |   | X |   |   |   | X |   | X |
| 6 |   | X |   |   |   | X | X |   |
| 7 |   | X |   |   | X |   |   | X |
| 8 | X |   |   |   | X |   | X |   |
| 9 | X |   |   | X |   | X |   | X |

GUN SHOT CONTROL UNIT FOR SEISMIC EXPLORATION

This is a continuation of application Ser. No. 163,600 filed June 27, 1980, now abandoned.

BACKGROUND

This invention relates to a gun shot control unit of the type used to control the firing of seismic sources and to a method of seismic exploration using this gun shot control unit with an on-bottom seismometer.

In seismic exploration, it is frequently desirable to fire the seismic source at precise times. For example, copending application, Ser. No. 163,757, filed June 27, 1980, Bowden, et al discloses an on-bottom seismometer unit in which a tape recorder is turned on and off at precise times to record seismic records produced from a source which is fired at precise times. Before the on-bottom seismometer is deployed, its clock is synchronized with the clock which controls the seismic source. Because of this, the record times in the seismometer are synchronized with the times at which the seismic source is fired. However, almost all seismic sources have an inherent delay between the time that they are commanded to fire and the actual occurrence of the seismic pulse. This inherent delay includes the mechanical lag of the mechanical parts which make up a typical air gun, for example. This inherent delay varies from source to source and may vary from time to time.

The prior art has recognized this inherent delay and has provided means for minimizing its significance. The principal thrust of prior art attempts to compensate for gun delays has been to synchronize the production of pulses from multiple seismic guns. It is desirable to precisely synchronize the production of seismic pulses from these many guns. It may be desirable to fire the guns simultaneously, or in a pattern with precise delays between the the seismic pulses from the many guns. In either event, the prior art has detected the times of firings of the guns, determined the time differences between the gun firings, and provided means for adjusting the times of firing of the various guns so that the desired firing pattern is obtained. For example, in U.S. Pat. No. 3,686,218 Ritter, the seismic sources are fired in response to a signal $FC_o$ from the recording system. The firing command delay unit 12 introduces variable delays which are settable by the switches 10. At a variable time, programmed by the switches 10, after the system firing command $FC_o$, the firing commands $FC_1$, $FC_2$, $FC_3$, and $FC_4$, are generated. These fire the guns. The signals $TB_1$, $TB_2$, $TB_3$, and $TB_4$ represent the actual time of firing of the guns. The variations between the system firing command $FC_o$ and the actual firings $TB_1$, $TB_2$, $TB_3$ and $TB_4$ are displayed in the display unit 16. If these variations are different from the desired delay, 20 milliseconds in the example under discussion, the switches 10 are changed to adjust the delay to that desired. Such a system is very useful in marine seismic exploration. However, when a seismic source is to be used with an on-bottom seismomenter of the type under consideration, one further capability must be provided. The gun control system must have the capability of precisely synchronizing the firing of the guns at precise times which coincide with times derived from a clock in the on-bottom seismometer. While the Ritter system has the capability of firing the guns at a variable time after the occurrence of a synchronizing pulse, i.e., $FC_o$, it does not have the capability of firing in synchronism with this signal. Also, the Input Output Company (IO) in Houston, Tex. supplies a gun controller which fires four guns. This system has a digital display for displaying the relative time of firing of all guns. From this digital display the operator can adjust the firing time, so that they are all equal, or in the desired timing pattern.

Systems of the type just described are desirable in all types of seismic exploration, including the on-bottom seismometer application referred to above. However, such a system does not provide the capability of synchronizing the firing of the the guns at precise times which coincide with times from a clock in a remote recording system.

OBJECTS OF THE INVENTION

Accordingly, it is an object of the present invention to provide a gun shot control unit for a seismic exploration system in which the seismic pulses are generated at precise, predetermined, times which coincide with times derived from a remote clock.

It is another object of the present invention to provide means for displaying a digital error signal representing positive and negative error between timing pulses and the actual firing of the gun.

It is a further object of the present invention to provide means for adjusting the time of firing of the guns with reference to the digital display of the error so that the positive or negative error can be minimized.

It is a further object of the present invention to provide an alarm which is actuated when the error signal is greater than a predetermined value.

SUMMARY OF THE INVENTION

In accordance with this invention, a gun shot control unit for a seismic exploration system has a digital clock producing regularly occurring timing pulses including shot timing pulses which occur before the desired time that the source is to be fired. An adjustable digital counter counts clock pulses in response to the occurrence of a shot timing pulse and produces a delayed shot command signal which occurs at an adjustable delay from the shot timing signal. Error measurement circuitry produces a digital error signal representing error between the signal representing the actual time of firing the gun and the next occurring timing pulse, i.e., the pulse at the desired time for firing the guns. This digital error signal is displayed so that the adjustable counter can be adjusted to minimize the error.

Further, an indication is provided of whether the actual gun signal or the next timing pulse occurs first. This indicates whether the gun is leading or lagging the timing pulse upon which firing is desired. Accordingly, the operator can adjust the digital counter to increase or decrease the delay so that compensation can be provided for both a lead or a lag.

In accordance with the invention, an alarm is activated when the digital error signal exceeds a settable predetermined value. The alarm is also actuated when the magnitude of the error signal exceeds the capacity of the digital counter which produces it. In this way, the operator is alerted that the displayed error magnitude is not correct.

The foregoing and other objects, features and advantages of the invention will be better understood from the following more detailed description and appended claims, together with the drawings.

SHORT DESCRIPTION OF THE DRAWINGS

Figure 4A:
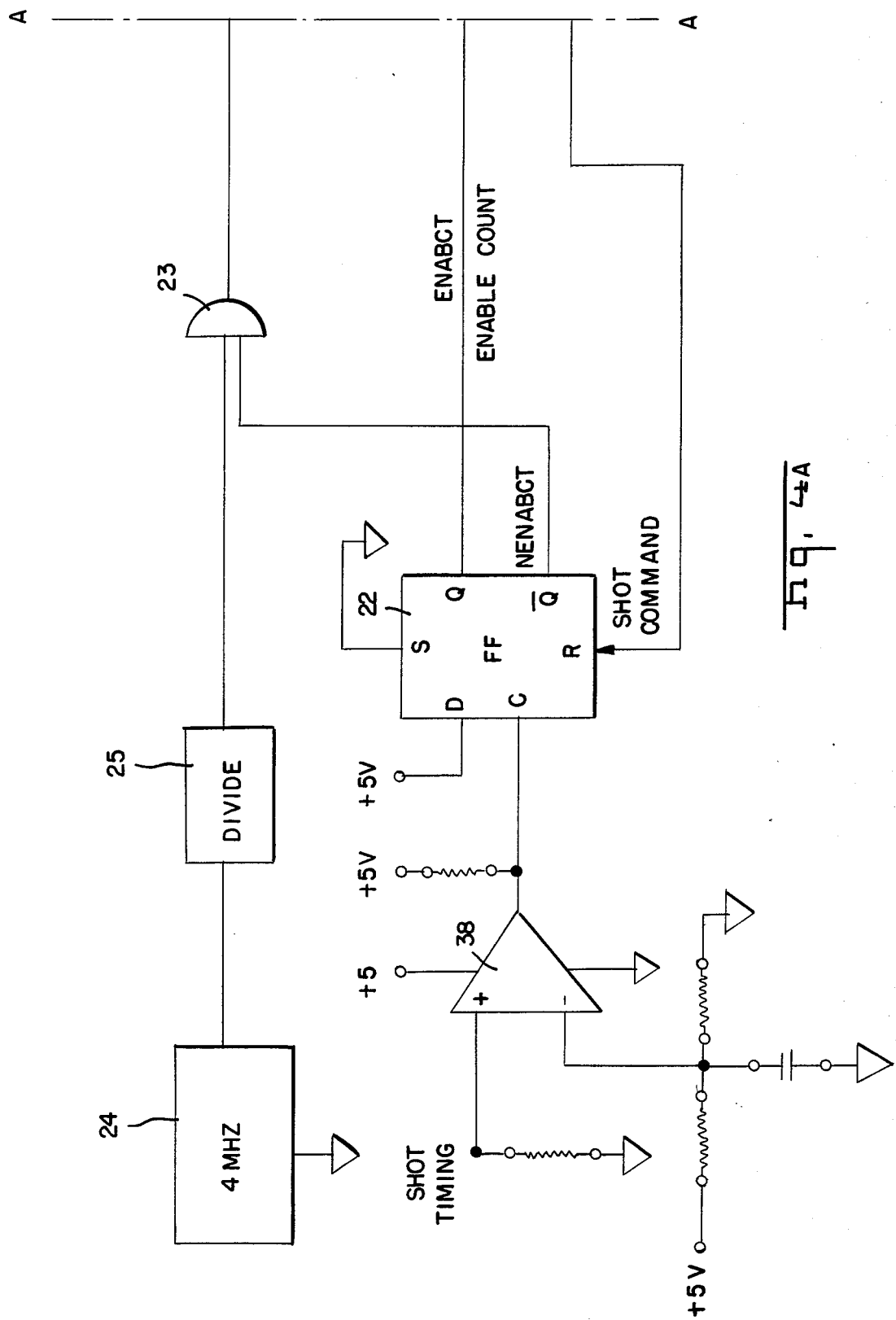
Figure 4B:
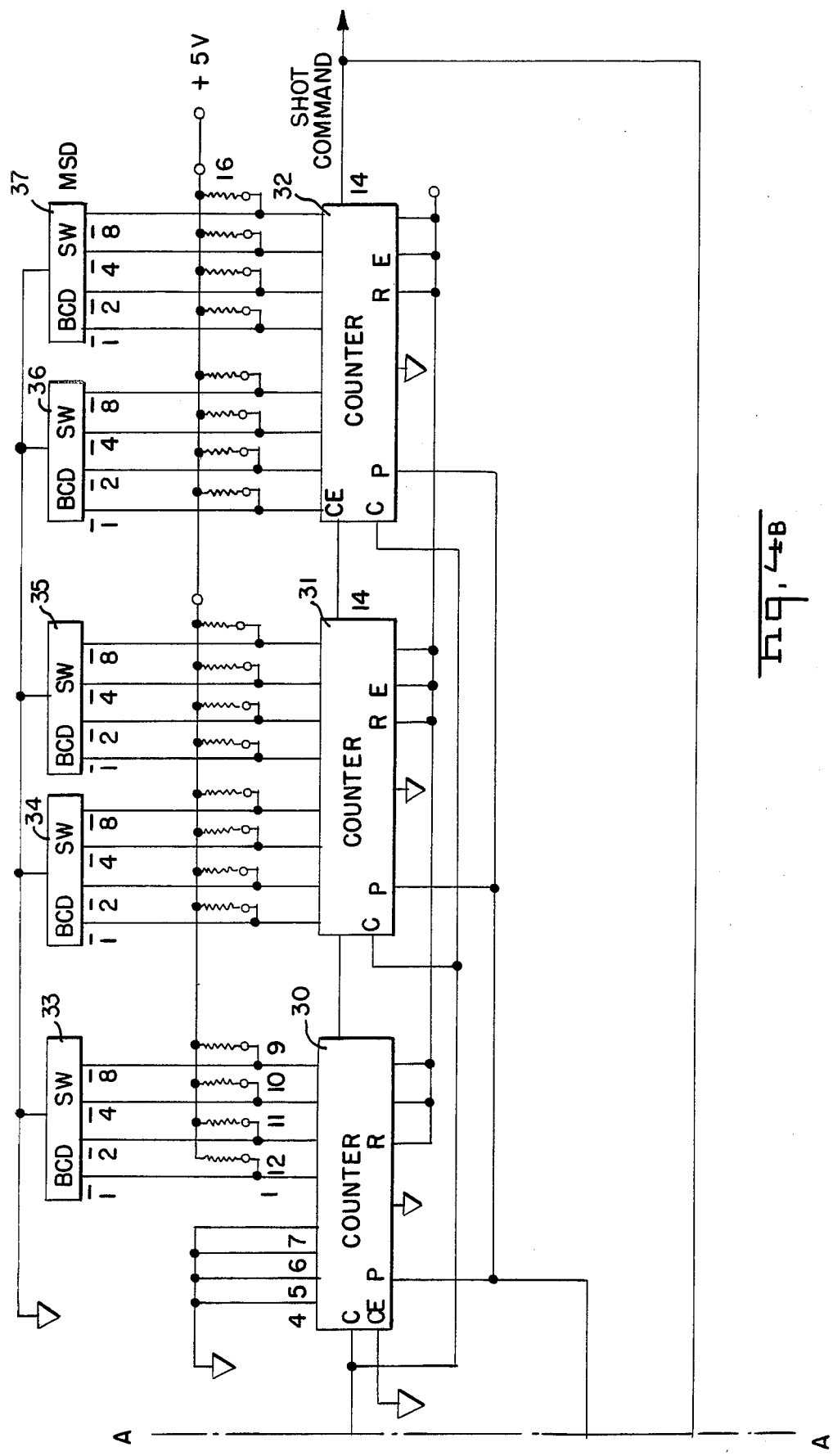
Figure 5A:
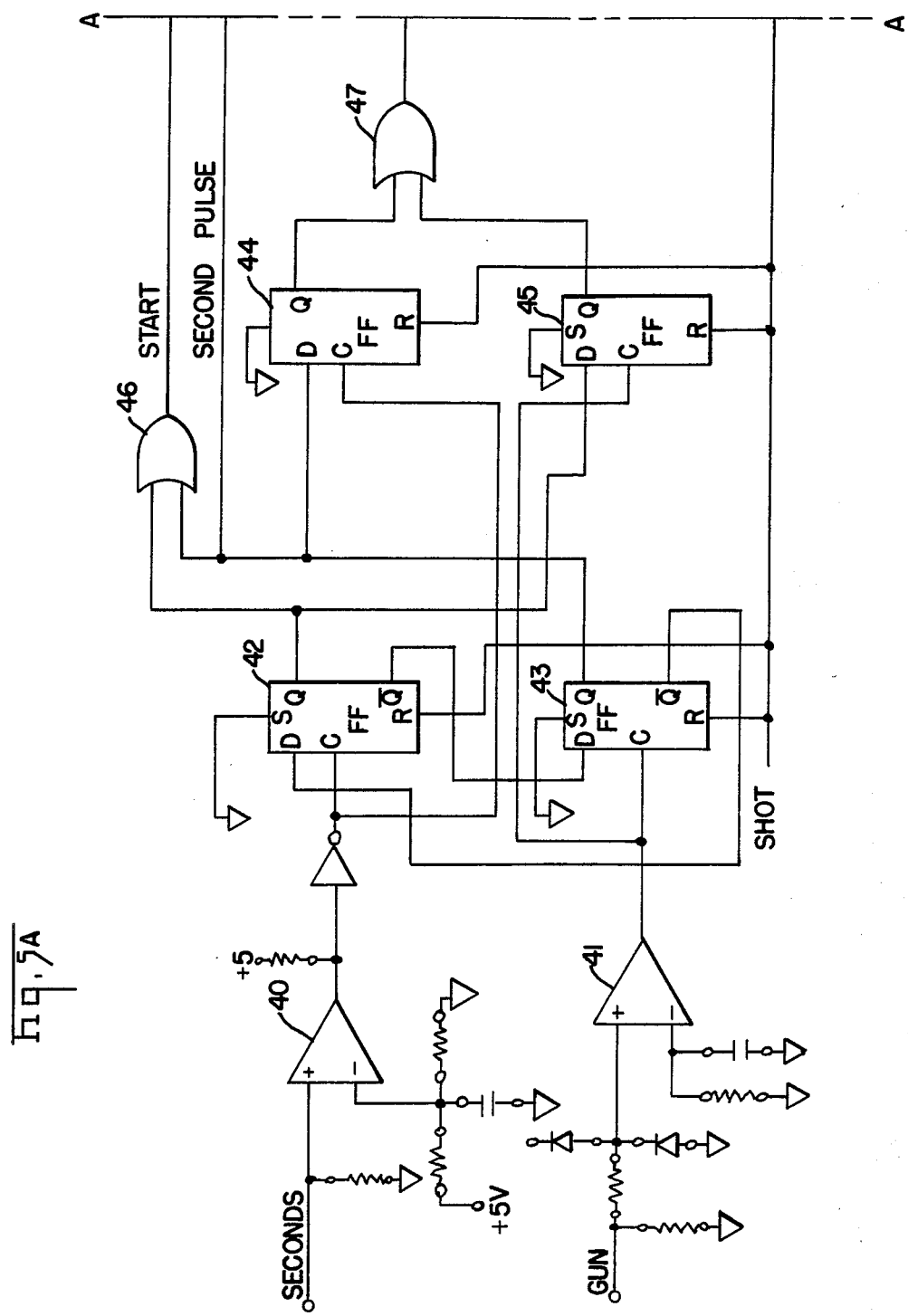
Figure 5B:
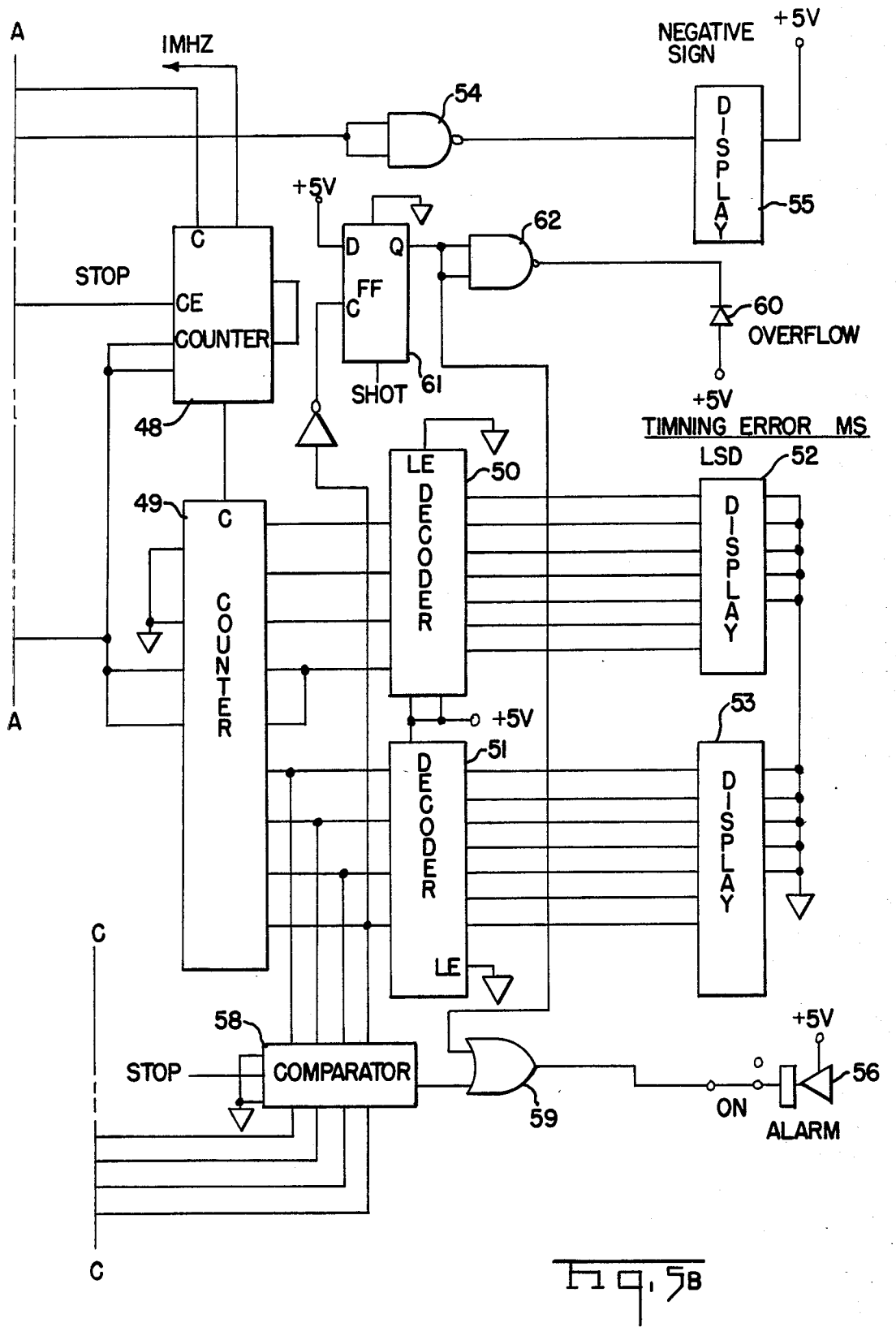
Figures 5C, 6:
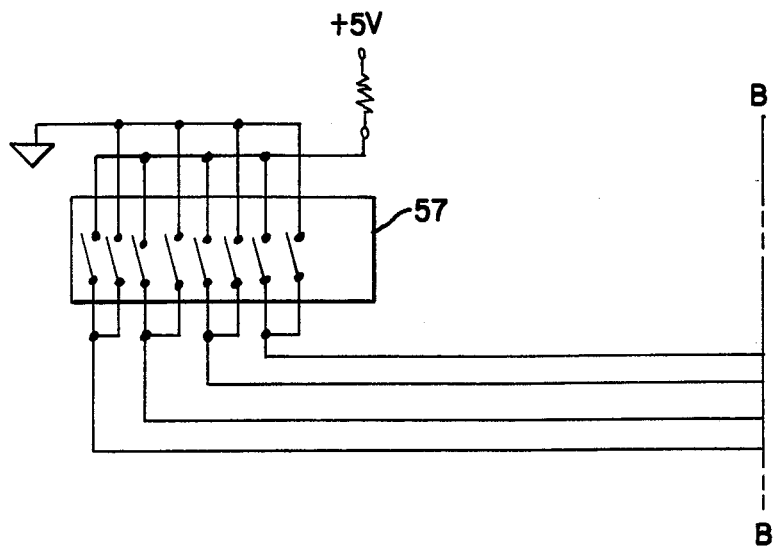

FIG. 4A and 4B together show the adjustable counter and related circuitry;

FIGS. 5A-5C together show the error measurement circuitry and display;

FIG. 6 shows the setting of the timing error switches to obtain different error limits.

Figure 1:
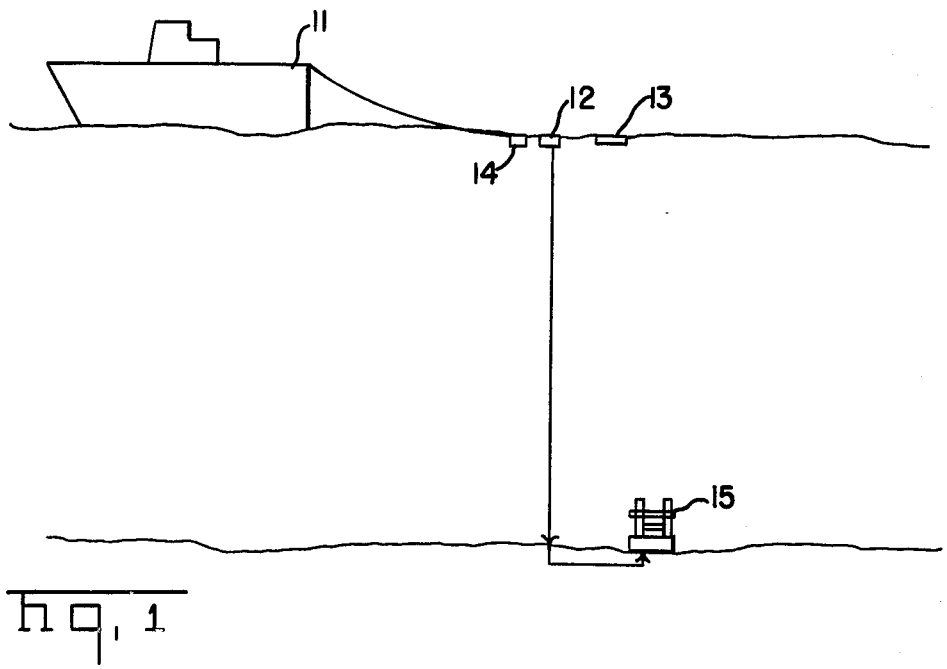
FIG. 1 depicts a marine seismic exploration system of the type in which the present invention can be used.

DESCRIPTION OF THE PREFERRED EMBODIMENT in FIG. 1, a seismic exploration vessel 11 tows a plurality of air guns 12, 13 which make up what is considered to be a single seismic source. The actual time of firing of the semismic source is detected by an accelerometer 14 which produces a gun signal. This source produces seismic pulses which travel through the water and the ocean bottom to the on-bottom seismometer (OBS) unit 15. This unit records the seismic records produced by the successively occurring seismic pulses. The unit 15 may be of the type described in the aforementioned Bowden, et al application, the disclosure of which is incorporated herein. This unit has a self-contained clock. Before the unit is deployed on the ocean bottom, the clock in the on-bottom seismometer 15 is precisely synchronized with a clock in the initialization unit which is on board the vessel 11.

Figure 3:
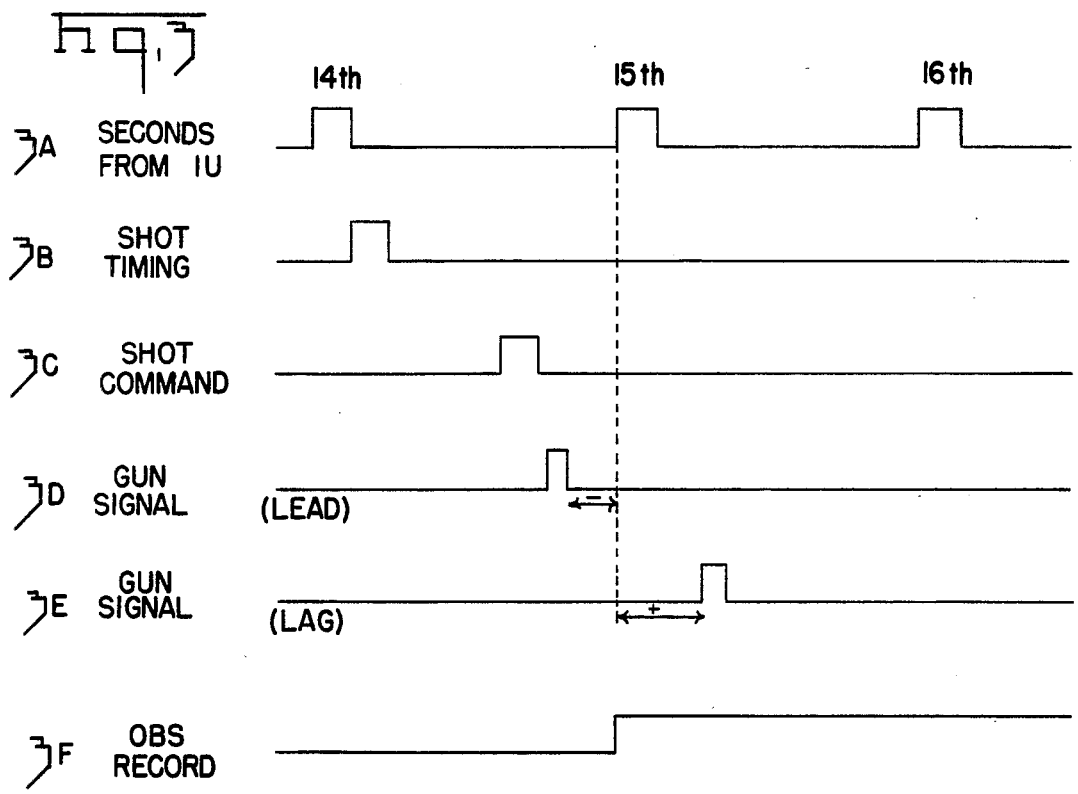
FIGS. 3A-3F are waveforms depicting the operation of the invention.
Figure 2:
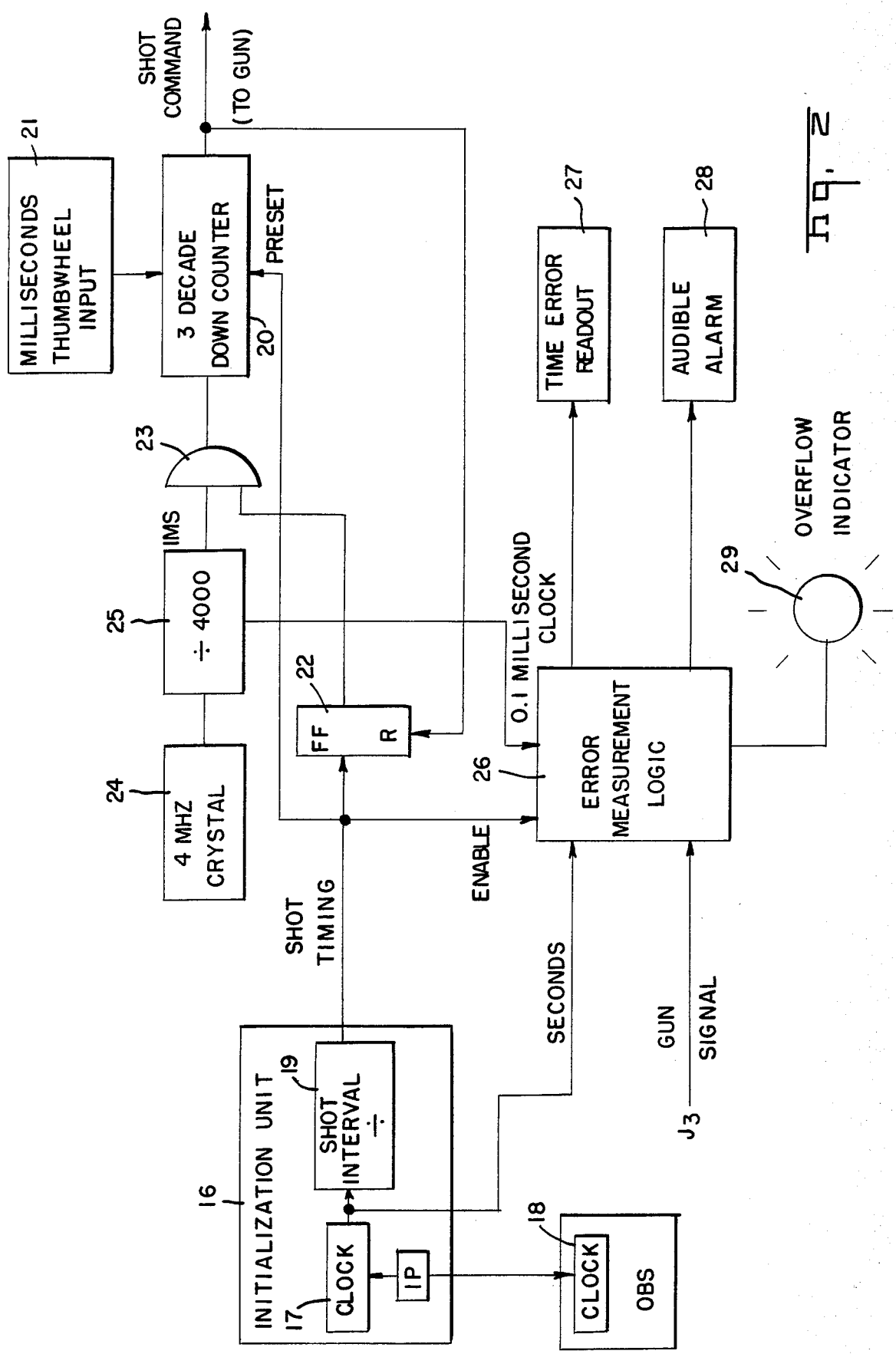
FIG. 2 shows a block diagram of the invention.

FIG. 2 shows the initialization unit 16 which has a digital clock 17 producing regularly occurring timing pulses. An initialization pulse is applied to the clock 17 and to the clock 18 in the on-bottom seismometer unit before that unit is deployed. The initialization unit further includes means for producing shot timing pulses at a time preceding the timing pulse upon which the occurrence of a seismic pulse is expected. This includes the shot interval divider 19. In the example under consideration, clock 17 produces pulses denoting seconds of time. Assume that it is desirable for the seismic sourced to be fired on 15 second intervals. FIG. 3A shows the pulses denoting the 14th, 15th, and 16th seconds. The shot interval timer produces a shot timing pulse, shown in FIG. 3B, upon the occurrence of the 14th seconds pulse. A shot command signal (FIG. 3C) is generated at an adjustable delay after the shot timing pulse. The shot command signal is applied to the seismic source to actuate it. The accelerometer 14 (FIG. 1) generates a gun signal (FIG. 3D or FIG. 3E) representing the actual time of occurrence of the seismic pulse. It is desired that the gun signal coincide with the 15th seconds pulse (FIG. 3A). This is desirable because the on-bottom seismometer produces a seismic record starting with the 15th seconds pulse. FIG. 3F shows the time of the starting of the OBS record. FIG. 3D is an example showing the gun signal leading the desired time of occurrence and FIG. 3E is an example showing the gun signal lagging the desired time of occurrence. The present invention provides means for adjusting the time of the shot command signal (FIG. 3C) so that this lead or lag is minimized.

Referring again to FIG. 12, the shot timing pulse presets a three decade down counter 20. The count preset into counter 20 is adjustable by the thumbwheel switches 21. The shot timing pulse also sets a flip flop 22 which enables a gate 23. This gate passes clock pulses from the clock including crystal 24 and divider 25. These pulses pass through gate 23 to the counter 20. At an adjustable time after the occurrence of the shot timing pulse, a delayed shot command signal is produced. This signal is applied to the seismic source to actuate it. By adjusting the thumbwheel switches 21 to vary the preset count set into the counter 20, the shot command signal is produced at the desired time.

In order to provide a display of the error between the timing pulses and the gun signal, error measurement logic circuitry 26 is provided. This circuitry generates a digital error signal representing the time between the gun signal and the next timing pulse, or the time between the next timing pulse and the gun signal, depending upon which occurs first. A digital display 27 provides a readout of this digital error signal. If the digital error signal is greater than a predetermined value, an alarm 28 is actuated. An overflow indicator 29 indicates when the magnitude of the digital error signal exceeds the capacity of the circuitry for measurement of it so that the operator is informed when the displayed error signal is not correct.

FIG. 4B shows the three decade counter which includes stages 30, 31 and 32. Binary coded decimal switches 33-37 control the count which is preset into the counter stages 30-32.

The shot timing pulse from the initialization unit is applied to the comparator 38 (FIG. 4A) which compares the signal to a threshold to avoid error resulting from spurious noise. The shot timing signal triggers the flip flop 22. The top output of flip flop 22 is applied to the counter stages 30, 31 and 32. The count determined by switches 33-37 is set into the counter stages 30-32 at this time.

The $\overline{Q}$ output of flip flop 22 is applied to the gate 23 to enable it. Clock pulses passing through gate 23 are applied to the counter stages 30-32. When the counter counts down to zero, a shot command pulse is produced. This resets the flip flop 22 and is used to actuate the seismic source as previously described. The occurrence of the shot command pulse is adjustable by changing the preset count in the switches 33-37.

FIGS. 5A-5C together show the error measurement circuitry and the display devices. The timing pulses which represent seconds from initialization unit 16 (FIG. 2) are applied to a comparator 40 which produces an output only when the input is above a predetermined threshold. The gun signal from the accelerometer 14 is applied to a similar comparator 41. The outputs of comparators 40 and 41 are respectively applied to the first pulse flip flops 42 and 43. If the seconds timing pulse occurs first, the flip flop 42 is set. If the gun signal occurs first, the flip flop 43 is set. The output of each flip flop is connected to the D input of the other flip flop so that when one flip flop is set, the other is disabled. The $\overline{Q}$ outputs of flip flops 42 and 43 are applied to an OR gate 46. Whichever one of the first pulse flip flops which is set first, OR gate 46 produces a START pulse.

The outputs of comparators 40 and 41 are also applied to the C inputs of second pulse flip flops 44 and 45. The $\overline{Q}$ outputs of flip flops 42 and 43 are applied respectively to the D inputs of flip flops 45 and 44. If the seconds timing pulse occurs first, flip flop 44 is disabled, but flip flop 5 is set by the gun signal applied to the C input thereof. On the other hand, if the gun signal occurs first, flip flop 45 is disabled but flip flop 44 is set by the seconds timing pulse applied to the C input thereof.

Whichever of flip flops 44 or 45 is set by the second occurring signal, its output acts through OR gate 47 to produce a STOP signal.

A digital counter including stages 48 and 49 counts clock pulses in the interval between the START and STOP signals. The outputs of stage 49 are applied to decoders 50 and 51. These translatethe BCD code of the counter to a seven segment code which is applied to the display units 52 and 53. These display devices produce a digital representation of the error signal in milliseconds.

If the gun signal occurs first, the flip flop 43 is set. The $\overline{Q}$ output of flip flop 43 is applied through NOR circuit 54 to actuate the negative sign display 55. When this display is actuated, this indicates that the gun signal leads the gun timing pulse, that is, there is a negative lag. No sign indication shows that there is a positive lag. In this way, the operator is informed of whether the gun signal or the timing signal occurred first. The magnitude of the error signal can then be used to minimize the lead or the lag, as the case may be.

When the magnitude of the error signal exceeds a predetermined value, an alarm 56 is actuated. The predetermined value is set by the switches 57. By properly setting these switches, the limit on the magnitude of the error can be determined. The settings of swiches 57 to select different limits of error is shown in FIG. 6. In an actual embodiment of the invention, for example, the error is normally kept under 4 milliseconds before the alarm is sounded.

The leads from the switches 57 are applied to a comparator 58. The four most significant digits from counter 49 are also applied to comparator 58. When the error signal, as represented by the count in counter 49, exceeds the predetermined value, as represented by the setting of switches 57, the comparator 58 produces an output which acts through OR gate 59 to actuate alarm 56.

In some instances, it is possible for the magnitude of the error signal to exceed the capacity of counter 49. When this occurs, the overflow indicator 60, which is a light emitting diode, is energized. The most significant stage of counter 49 is connected to set the overflow flip flop 61. When this flip flop is set, NOR gate 62 energizes overflow indicator 60. The output of flip flop 61 is also connected through the OR gate 59 to energize the alarm 56.

While a particular embodiment of the invention has been shown and described, modifications may be made without departing from the true spirit and scope of the invention. The appended claims are, therefore, intended to cover all such modifications.

What is claimed is:

1. In a seismic exploration system wherein seismic pulses are generated at regularly occurring intervals, by a seismic source which is actuated in response to a shot command signal, and received by at least one remotely located detector, a shot control unit for adjusting the time of said seismic pulses comprising:
   a digital first clock which can be synchronized with a second clock provided in said remotely located detector, for producing regularly occurring first timing pulses; means responsive to said first timing pulses for producing a shot timing pulse at a time preceding one of said first timing pulses; said one timing pulse occurring at a desired time of occurrence of a seismic pulse;
   an adjustable digital counter, said shot timing pulse being applied to said digital counter so that a shot command signal is generated by said digital counter at a time having an adjustable difference from said shot timing pulse, said shot command signal being applied to said seismic source to actuate it, said adjustable difference being combined with an inherent delay between said actuation of said seismic source and said shot command signal to produce a seismic pulse at said desired time;
   means for producing a gun signal representing the actual time of occurrence of the actuation of said seismic source;
   error measurement circuitry producing a digital error signal representing the error between the time of occurrence of said one timing pulse representing the desired time of seismic source firing and the time of occurrence of said gun signal wherein said error measurement circuitry comprises:
   a second digital counter for counting clock pulses in the interval between start and stop signals applied thereto;
   means responsive to the first occurrence of said gun signal or said one timing pulse for producing a start signal for said second digital counter;
   means responsive to the second occurrence of said gun signal of said one timing pulse for producing a stop signal for said second digital counter;
   an overflow indicator connected to said second digital counter for indicating that the magnitude of said error exceeds the capacity of said digital counter; and,
   means for utilizing said digital error signal so that said adjustable counter can be adjusted to minimize either a leading or lagging error.

2. The control unit of claim 1, wherein said utilizing means is a display means for displaying said digital error signal.

3. The control unit recited in claim 1 further comprising:
   an alarm actuated when said error signal is greater than a predetermined value.

4. The control unit recited in claim 1 further comprising:
   means for detecting the first occurrence of said gun signal or the said one timing pulse; and
   means responsive to said last named means for displaying an indication of whether said gun signal or said one timing pulse occurred first.

5. The control unit recited in claim 1 wherein said means responsive to the first occurrence includes:
   two first pulse flip flops, said one timing pulse being applied to one of said flip flops and said gun signal being applied to the other of said flip flops, one of said flip flops being set by the first occurring of said gun signal or said one timing pulse; and
   wherein said means responsive to the second occurrence includes:
   two second pulse flip flops, said gun signal being applied to one of said flip flops and said one timing pulse being applied to the other of said flip flops, the outputs of said first pulse flip flops being connected to enable said second pulse flip flops whereby the second occurring of said gun signal and said one timing pulse sets one of said second pulse flip flops.

6. The control unit recited in claim 5 further comprising:

an indicator for indicating whether said error signal is a lag or a lead, one of said flip flops being connected to said indicator whereby the first occurrence of said gun signal or said one timing pulse sets said indicator.

7. The control unit recited in claim 1 further comprising:
an alarm, a most significant stage of said second digital counter being applied to actuate said alarm to indicate that the magnitude of said error signal exceeds the capacity of said second digital counter.

8. The control unit recited in claim 3 further comprising:
manually settable switches for setting said predetermined value;
a comparator, said error signal and the outputs of said manually settable switches being applied to said comparator, said comparator being connected to said alarm to actuate it when said error signal is greater than said predetermined value.

* * * * *